US010754772B2

(12) United States Patent
Schreter et al.

(10) Patent No.: US 10,754,772 B2
(45) Date of Patent: Aug. 25, 2020

(54) RECLAMATION OF IN-MEMORY DATABASE MEMORY RESOURCES

(71) Applicant: SAP SE, Walldorf (DE)

(72) Inventors: Ivan Schreter, Malsch (DE); Daniel Booss, Wiesloch (DE)

(73) Assignee: SAP SE, Walldorf (DE)

( * ) Notice: Subject to any disclaimer, the term of this patent is extended or adjusted under 35 U.S.C. 154(b) by 1106 days.

(21) Appl. No.: 15/181,845

(22) Filed: Jun. 14, 2016

(65) Prior Publication Data
US 2017/0357578 A1    Dec. 14, 2017

(51) Int. Cl.
*G06F 12/02*    (2006.01)
*G06F 16/22*    (2019.01)
*G06F 16/23*    (2019.01)

(52) U.S. Cl.
CPC ...... *G06F 12/0276* (2013.01); *G06F 12/0253* (2013.01); *G06F 16/2282* (2019.01); *G06F 16/2379* (2019.01); *G06F 2212/1044* (2013.01)

(58) Field of Classification Search
CPC .................................................. G06F 12/0253
See application file for complete search history.

(56) References Cited

U.S. PATENT DOCUMENTS

| | | | | |
|---|---|---|---|---|
| 6,125,434 A * | 9/2000 | Willard | ............... | G06F 12/0253 707/999.202 |
| 2002/0116569 A1* | 8/2002 | Kim | .................... | G06F 12/0246 711/103 |
| 2002/0118645 A1* | 8/2002 | Narayana | ................ | H04L 47/10 370/231 |
| 2007/0103984 A1* | 5/2007 | Kavuri | .................. | G06F 3/0605 365/185.17 |
| 2011/0066808 A1* | 3/2011 | Flynn | .................. | G06F 12/0246 711/118 |
| 2014/0006473 A1* | 1/2014 | Raghunathan | .......... | G06F 9/548 709/201 |
| 2014/0033213 A1* | 1/2014 | Hudson | ..................... | G06F 9/54 718/102 |
| 2016/0048464 A1* | 2/2016 | Nakajima | ........... | G06F 12/1475 711/152 |
| 2017/0091107 A1* | 3/2017 | Peterson | ............ | G06F 12/0806 |

* cited by examiner

*Primary Examiner* — Mohammad S Rostami
(74) *Attorney, Agent, or Firm* — Mintz Levin Cohn Ferris Glovsky and Popeo, P.C.

(57) ABSTRACT

A method for reclaiming memory resources may include segmenting a plurality of memory resources in an in-memory database into a first resource partition and a second resource partition; generating, for the first resource partition, a first heap containing a first plurality of memory resources sorted based on an age of data occupying the first plurality of memory resources; generating, for the second resource partition, a second heap containing a second plurality of memory resources sorted based on an age of data occupying the second plurality of memory resources; and when a shortage of memory resources is detected, identifying, from the first heap, a first memory resource containing a least recently used data, identifying, from the second heap, a second memory resource containing a least recently used data, and reclaiming the first memory resource and/or the second memory resource. Related systems and articles of manufacture are also disclosed.

14 Claims, 6 Drawing Sheets

FIG. 1B

RECLAMATION OF IN-MEMORY DATABASE MEMORY RESOURCES

FIELD

The present disclosure generally relates to database processing and, more specifically, to the reclamation of in-memory database memory resources.

BACKGROUND

Many storage systems implement some variation of a tiered storage scheme. For instance, data may be loaded from disk and cached in an in-memory database. Caching data in an in-memory database may accelerate access to data in a storage system. However, a finite amount of in-memory database memory resources may necessitate the reclamation of in-memory database memory resources from time to time (e.g., when the in-memory database becomes full). That is, existing data currently occupying in-memory database memory resources may be discarded (e.g., overwritten) in order to make space for new data loaded from disk.

SUMMARY

Methods, systems, and articles of manufacture, including computer program products, are provided for reclamation of memory resources in an in-memory database. In some example embodiments, there is provided a method that includes: segmenting, at an in-memory database, a plurality of memory resources into a first resource partition and a second resource partition; generating, for the first resource partition, a first heap containing a first plurality of memory resources, wherein the first plurality of memory resources are sorted based at least in part on an age of data occupying the first plurality of memory resources; generating, for the second resource partition, a second heap containing a second plurality of memory resources, wherein the second plurality of memory resources are sorted based at least in part on an age of data occupying the second plurality of memory resources; and when a shortage of memory resources is detected at the in-memory database, identifying, from the first heap, a first memory resource containing a least recently used data in the first heap, identifying, from the second heap, a second memory resource containing a least recently used data in the second heap, and reclaiming the identified first memory resource and/or the identified second memory resource, wherein the reclaiming is based at least in part on a respective age and/or weight class of a data occupying the first memory resource and a data occupying the second memory resource.

In some variations, one or more of the features disclosed herein including the following features can optionally be included in any feasible combination. The reclaiming may include overwriting data currently occupying the identified first memory resource and/or the identified second memory resource.

In some variations, the first heap may be associated with a first weight class and the second heap may be associated with a second weight class. The method may further include: determining a respective age to weight class ratio for the data occupying the first memory resource and the data occupying the second memory resource; and reclaiming the first memory resource before the second memory resource, when the data occupying the first memory resource has a higher age to weight class ratio than the data occupying the second memory resource.

In some variations, the first heap and the second heap may be associated with a first weight class. The first weight class may be lower than a second weight class. The first plurality of memory resources and the second plurality of memory resources may be reclaimed before a third plurality of memory resources from a third heap associated with the second weight class. The method may further include: identifying a least recently used data from the first weight class at least by comparing the age of the data occupying the first memory resource and the age of the data occupying the second memory resource; and reclaiming the one of the first memory resource and the second memory resource that contains the least recently used data from the first weight class.

In some variations, the method may further include: detecting a use of data occupying the first memory resource and/or the second memory resource; and flagging the first memory resource and/or the second memory resource, wherein the flagging prevents the first memory resource and/or the second memory resource from being reclaimed.

In some variations, the first heap and the second heap may be generated asynchronously. The method may further include generating, for the first resource partition and/or the second resource partition, a plurality of other heaps.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1B illustrates a row store and a column store, in accordance with some example embodiments;

Figure 1A:
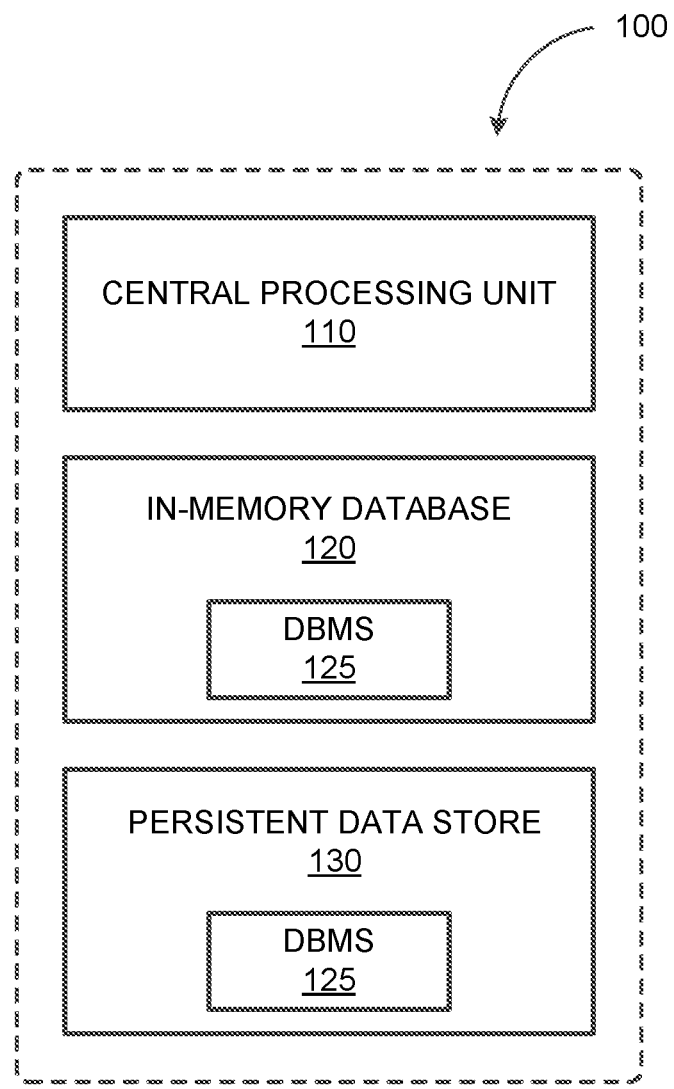
FIG. 1A depicts a block diagram illustrating a storage system, in accordance with some example embodiments.

Like labels are used to refer to same or similar items in the drawings.

DETAILED DESCRIPTION

As noted above, in-memory database memory resources may be reclaimed in order to accommodate new data. An in-memory database memory resource may be a portion (e.g., column, row) of the memory or space in the in-memory database. Reclaiming an in-memory database memory resource may provide an indication that the data currently occupying that memory resource may be discarded (e.g., overwritten) and that the memory resource may be used to store different data. The order in which in-memory database memory resources are reclaimed may be determined based on an age (or another attribute) of the data currently occupying the individual memory resources. For example, memory resources containing data that have not been used (e.g., read, written to) recently may be reclaimed before memory resources containing data that have been used recently. Hence, in order to free up memory resources in the in-memory database for new data, data that have been used (e.g., read, written to) may be discarded (e.g., overwritten) before data that have been used recently.

Generating a heap may sort the memory resources in the in-memory database in accordance with the respective ages of the data currently occupying the memory resources. The reclamation of memory resources may start with the memory resource at the root of the heap since that memory resource may contain, for example, the least recently used (e.g., read or written) data. However, generating a single heap for all the memory resources in an in-memory database may be excessively time-consuming, especially when the in-memory database may contain numerous memory resources. As such, reclaiming in-memory database memory resources using only a single heap may impose significant delay to data access.

In some example embodiments, a plurality of heaps may be generated in order to reclaim in-memory database memory resources. For instance, memory resources in an in-memory database may be segmented into multiple memory resource partitions (e.g., stripes) and at least one heap may be generated for an individual memory resource partition. The heaps may be generated based on an age (or another attribute) of the data currently occupying the memory resources within the memory resource partition. Moreover, according to some example embodiments, each memory resource partition may include data from different weight classes. For example, data may be assigned to a weight class (e.g., by a user) that corresponds to an importance and/or priority associated with the data (or type of data). As such, a separate heap may be generated for each weight class of data present in a memory resource partition.

In some example embodiments, the plurality of heaps may be generated asynchronously. That is, at least some of the plurality of heaps may be generated in parallel. Moreover, in some example embodiments, the generation of the plurality of heaps may be a background process that does not coincide with the reclamation of in-memory database memory resources. For example, the plurality of heaps may be generated in accordance with a schedule (e.g., every hour) and/or in anticipation of a shortage of in-memory database memory resources (e.g., when an amount of available in-memory database memory resources falls below a threshold value).

In some example embodiments, reclaiming in-memory database memory resources may include identifying an in-memory database memory resource that contains the least recently used (e.g., read or written) data at each of the plurality of heaps. Reclaiming in-memory database memory resources may further include determining, for the memory resource containing the least recently used data in each heap, an age to weight class ratio for the data occupying the memory resource. The memory resource that contains data having a highest age to weight class ratio from across the plurality of heaps may be reclaimed.

Alternately or additionally, in some example embodiments, reclaiming in-memory database memory resources may include identifying heaps that are associated with the lowest weight class (e.g., least important or lowest priority data). Reclaiming in-memory database memory resources may further include identifying a memory resource containing a least recently used data amongst the data assigned the lowest weight class.

In some example embodiments, the position of a memory resource within a heap may correspond to an age of the data occupying the memory resource at a time when the heap is generated. For example, the data may be the least recently used data within the heap when the heap is generated. Accordingly, the memory resource containing the least recently used data may be at the root of the heap and may be reclaimed when necessary (e.g., when the in-memory database is full). However, the data may be used subsequent to the generation of the heap such that the data is no longer the least recently used data within the heap. Consequently, the memory resource containing such data should not be reclaimed even if the memory resource is at the root of the heap. Thus, according to some example embodiments, when data is used after the generation of a corresponding heap, the memory resource containing the data may be flagged to indicate that the memory resource cannot be reclaimed since an age of the data currently occupying the memory resource has changed (e.g., to a later time). Flagging the memory resource may therefore prevent the memory resource from being reclaimed prematurely.

One or more of the plurality of heaps may become empty during the reclamation of in-memory database memory resources. In some example embodiments, one or more empty heaps may be rebuilt (e.g., asynchronously) during the reclamation of in-memory database memory resources. The latency caused by the rebuilding of an empty heap may be minimal since each heap may include a small portion of the memory resources from the in-memory database. Alternately or additionally, in some example embodiments, the reclamation of in-memory database memory resources can proceed with the remaining plurality of heaps and the one or more empty heaps may be rebuilt (e.g., asynchronously) at a later time (e.g., according to a regular schedule).

FIG. 1A depicts a block diagram illustrating a storage system 100, in accordance with some example embodiments. Referring to FIG. 1A, the storage system 100 may include a central processing unit 110, an in-memory database 120, and a persistent data store 130. In some example embodiments, the central processing unit 110 may be a microprocessor and/or a microcontroller. The storage system 100 can include additional and/or different components than shown without departing from the scope of the present disclosure.

In some example embodiments, the in-memory database 120 may be adapted to provide memory resources (e.g., from main memory) for caching data from the persistent data store 130 thereby reducing the latency associated with accessing data in the storage system 100. For instance, the in-memory database 120 may be an SAP HANA database available from SAP SE of Walldorf Germany, although another type of in-memory database may be used to implement the in-memory database 120 without departing from the scope of the present disclosure. According to some example embodiments, the in-memory database 120 may be implemented as a column store and memory resources within the in-memory database 120 may correspond to columns in the column store. Alternately or additionally, the in-memory database 120 may be implemented as a row store and memory resources within the in-memory database 120 may correspond to rows in the row store.

In some example embodiments, the in-memory database 120 may include a first database management system (DBMS) 125. The first database management system 125 may be configured to control the operations of the in-memory database 120 including, for example, the reclamation of memory resources (e.g., columns, rows) within the in-memory database 120. An in-memory database such as the in-memory database 120 may rely on a main memory (e.g., volatile memory such as dynamic random access memory) for storing data. That is, data stored to the in-memory database 120 may be stored in a main memory instead of, for example, to disk (e.g., the persistent data store 130). Storing at least some data in the in-memory database 120 may accelerate access to such data as read operations on the data may be performed without accessing the persistent data store 130.

In some example embodiments, the persistent data store 130 may include a second database management system (DBMS) 135. The persistent data store 130 may include hard drives, solid state drives, optical drives, magnetic drives, and/or other storage devices adapted to provide persistent (e.g., long term, archival) storage of data. The second database management system 135 may be configured to control the operations of the persistent data store 130 including, for example, the transfer of data to the in-memory database 120.

Figure 1B:
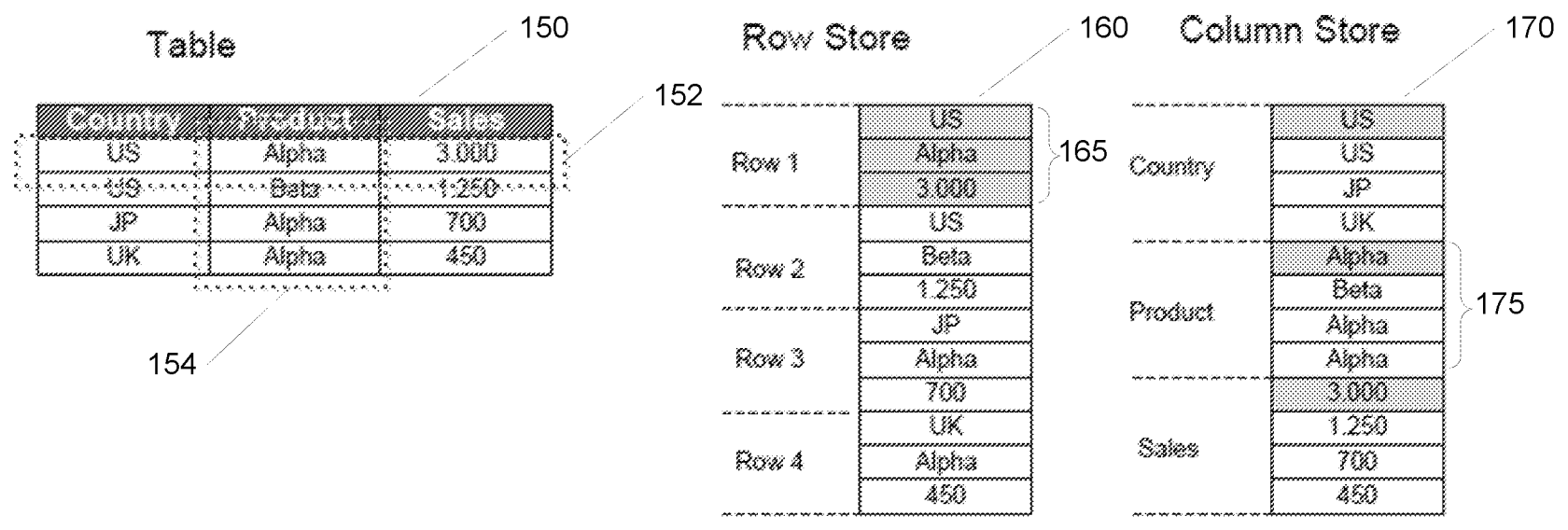

FIG. 1B illustrates a row store 160 and a column store 170, in accordance with some example embodiments. Referring to FIG. 1A-B, the data stored in the in-memory data store 120 may be organized in a table format (e.g., a table 150). By contrast, memory for storing data (e.g., the memory resources in the in-memory data store 110) may be organized in a linear sequence. Thus, if the in-memory data store 120 is implemented as the row store 160, data from a same row of the table 150 (e.g., a top row 152) may be stored in contiguous memory locations (e.g., a first memory block 165). Meanwhile, if the in-memory data store 120 is implemented as the column store 170, data from a same column of the table 150 (e.g., a center column 154) may be stored in contiguous memory locations (e.g., a second memory block 175). The in-memory data store 120 may be implemented as a different type of data store without departing from the scope of the present disclosure.

Figure 2:
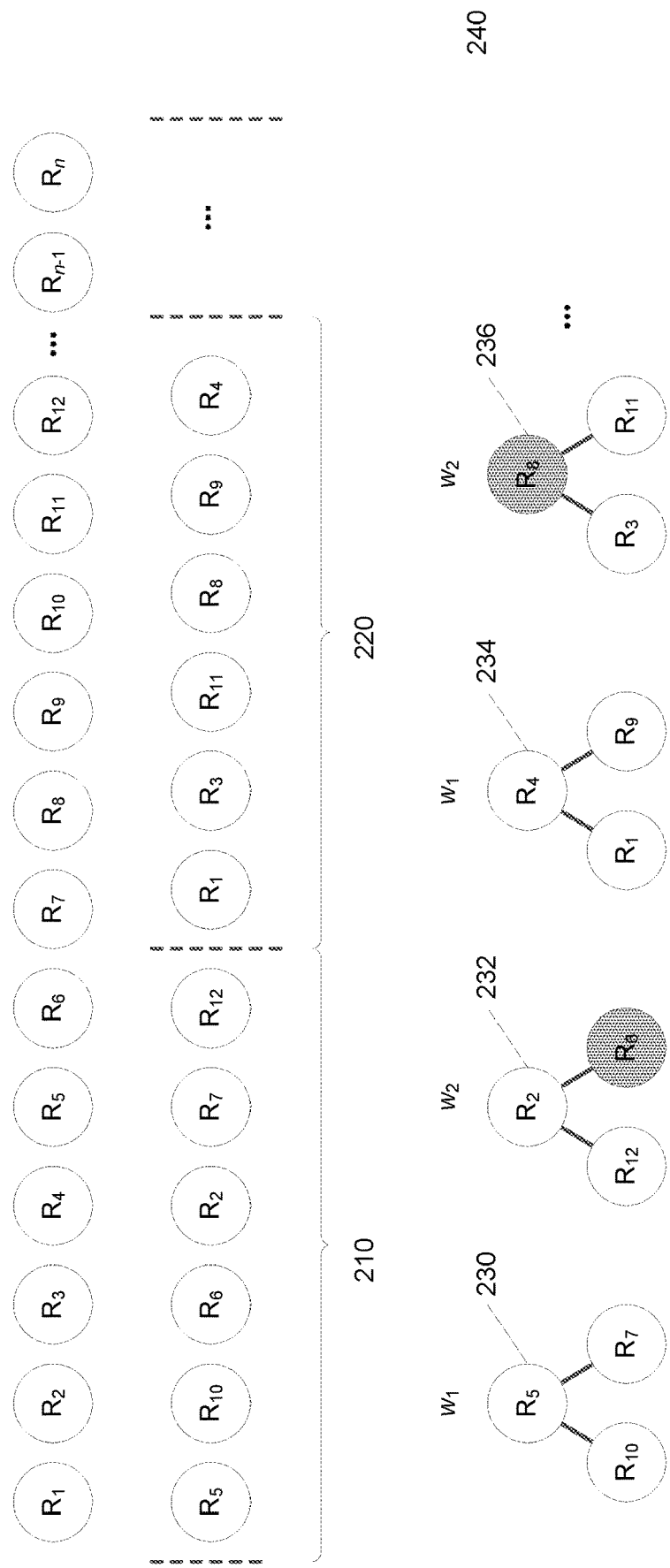
FIG. 2 depicts memory resources, memory resource partitions, and heaps, in accordance with some example embodiments.

FIG. 2 depicts memory resources, memory resource partitions, and heaps, in accordance with some example embodiments. Referring to FIGS. 1A and 2, the in-memory database 110 may include an number of memory resources (e.g., columns, rows) from $R_1$ through $R_n$. In some example embodiments, the n number of memory resources (e.g., columns, rows) may be segmented into an s number of memory resource partitions such that each memory resource partition includes approximately an n/s number of memory resources. For instance, one or more hash functions may be applied to a memory resource to determine which one of the s number of memory resource partitions in which to include that memory resource. As shown in FIG. 2, the s number of memory resource partitions may include, for example, a first memory resource partition 210 and a second memory resource partition 220. The first memory resource partition may include memory resources $R_2$, $R_5$, $R_6$, $R_7$, $R_{10}$, and $R_{12}$. Meanwhile, the second memory resource partition may include memory resources $R_1$, $R_3$, $R_4$, $R_8$, $R_9$, and $R_{11}$.

In some example embodiments, a w number of heaps may be generated for each of the s number of memory resource partitions. For instance, for each of the s number of memory resource partitions, a separate heap may be generated for each different weight class of data present in the in-memory database 110. As shown in FIG. 2, the data currently occupying the n number of memory resources in the in-memory database 110 may be assigned a w number of different weight classes including, for example, the weight class and the weight class $w_2$. According to some example embodiments, the weight class of data may reflect an importance and/or priority of the data. A memory resource containing less important and/or lower priority data may be reclaimed before a memory resource containing more important and/or higher priority data.

Referring again to FIG. 2, an s×w number of heaps may be generated for the data currently occupying the n number of memory resources in the in-memory database 110. For example, a first heap 230 and a second heap 232 may be generated for the first memory resource partition 210. A third heap 234 and a fourth heap 238 may be generated for the second memory resource partition 220. The heaps (e.g., the first heap 230, the second heap 232, the third heap 234, and/or the fourth heap 236) may be generated asynchronously (e.g., in parallel). The heaps may further be generated in accordance to a schedule (e.g., every hour) and/or in anticipation of shortage of memory resources within the in-memory database 110.

In some example embodiments, the first heap 230 and the third heap 234 may correspond to the weight class $w_1$ while the second heap 232 and the fourth heap 236 may correspond to the weight class $w_2$. As such, the memory resources in the first heap 230 (e.g., $R_5$, $R_7$, and $R_{10}$) and the third heap 234 (e.g., $R_1$, $R_4$, and $R_9$) may contain data belonging to the weight class $w_1$. The memory resources in the second heap 232 (e.g., $R_2$, $R_6$, and $R_{12}$) and the fourth heap 236 (e.g., $R_3$, $R_8$, and $R_{11}$) may contain data belonging to the weight class $w_2$.

In some example embodiments, the memory resources within a heap may be arranged such that data currently occupying a memory resource at a parent node may have been used at the same or earlier time than data currently occupying a memory resource at a child node. For example, in the first heap 230, the data currently occupying the memory resource $R_5$ may be used at a same or earlier time than the data currently occupying both the memory resource $R_7$ and the memory resource $R_{10}$. Similarly, in the second heap 232, the data currently occupying both the memory resource $R_2$ may be used at the same or earlier time than the data currently occupying both the memory resource $R_6$ and the memory resource $R_{12}$. In some example embodiments, unless a memory resource at the root node of a heap is flagged, that memory resource may contain the least recently used data within the heap.

In some example embodiments, the first heap 230 may be generated at a first time $t_1$. Thus, the positions of the memory resources $R_3$, $R_8$, and $R_{11}$ within the fourth heap 236 may correspond to an age of the data currently occupying these memory resources at the first time $t_1$. As shown in FIG. 2, at the first time $t_1$, the memory resource $R_8$ contained the least recently used data within the fourth heap 236 and may be reclaimed when necessary (e.g., when the in-memory database 110 is full). However, the data currently occupying the memory resource $R_8$ may be used at a second time $t_2$ after the generation of the fourth heap 236 at the first time $t_1$. As such, in some example embodiments, the memory resource $R_8$ may be flagged (shown as shaded in FIG. 2) to indicate that the memory resource $R_8$ may not be reclaimed because the data currently occupying the memory resource $R_8$ is no longer the least recently used data within the first heap 230.

Similarly, the second heap 232 may also be generated at the first time $t_1$. Thus, the positions of the memory resources $R_2$, $R_6$, and $R_{12}$ within the second heap 232 may correspond to an age of the data currently occupying these memory resources at the first time $t_1$. As shown in FIG. 2, at the first time $t_1$, the memory resource $R_2$ may contain the least recently used data within the second heap 232 and may be reclaimed when necessary (e.g., when the in-memory database 110 is full). Meanwhile, the data currently occupying the memory resource $R_6$ may be used (e.g., at the second time $t_2$) after the generation of the second heap 232 at the first time $t_1$. As such, in some example embodiments, the memory resource $R_6$ may be flagged (shown as shaded in FIG. 2) to indicate that the memory resource $R_6$ may not be reclaimed. That is, the memory resource $R_6$ may not be reclaimed even when the memory resource $R_6$ advances to the root of the second heap 232 (e.g., after reclamation of the memory resource $R_2$).

In some example embodiments, memory resources (e.g., the memory resources $R_1$ through $R_n$) may be reclaimed (e.g., when the in-memory database 110 is full) based on an age to weight class ratio of the data occupying the memory resources. As such, the memory resources to reclaim may be identified by identifying, for each heap, a memory resource that contains the least recently used data in that each heap. An age to weight class ratio may be determined for each memory resource containing the least recently used data in a heap. The memory resource to reclaim may be the memory resource that contains data with the highest age to weight class ratio. For example, an age to weight class ratio may be determined for the memory resources $R_2$, $R_4$, and $R_5$, which contain the least recently used data from the first heap 230, the second heap 232, and the third heap 234. Referring again to FIG. 2, note that the memory resource $R_8$ may be flagged (e.g., due to use of the data currently occupying these memory resources) and cannot be reclaimed. Thus, the memory resource to reclaim may be whichever one of the memory resources $R_2$, $R_4$, and $R_5$ that contains the data with a highest age to weight class ratio.

Alternately or additionally, the memory resource to reclaim may, in some example embodiments, be identified by identifying the heaps that are associated with the lowest weight class (e.g., least important or lowest priority data). Thus, the memory resource to reclaim may contain be the least recently used data from amongst data with the lowest weight class. For instance, suppose $w_1$ is a lower weight class than $w_2$, then the first heap 230 and the third heap 234 may be identified. The ages of the least recently used data from the first heap 230 and the third heap 234 (e.g., at the root nodes of the first heap 230 and the third heap 234) may be compared such that the memory resource (e.g., $R_4$ or $R_5$) containing the least recently used data from the weight class $w_1$ may reclaimed when necessary (e.g., when the in-memory database 110 is full).

Figure 3:
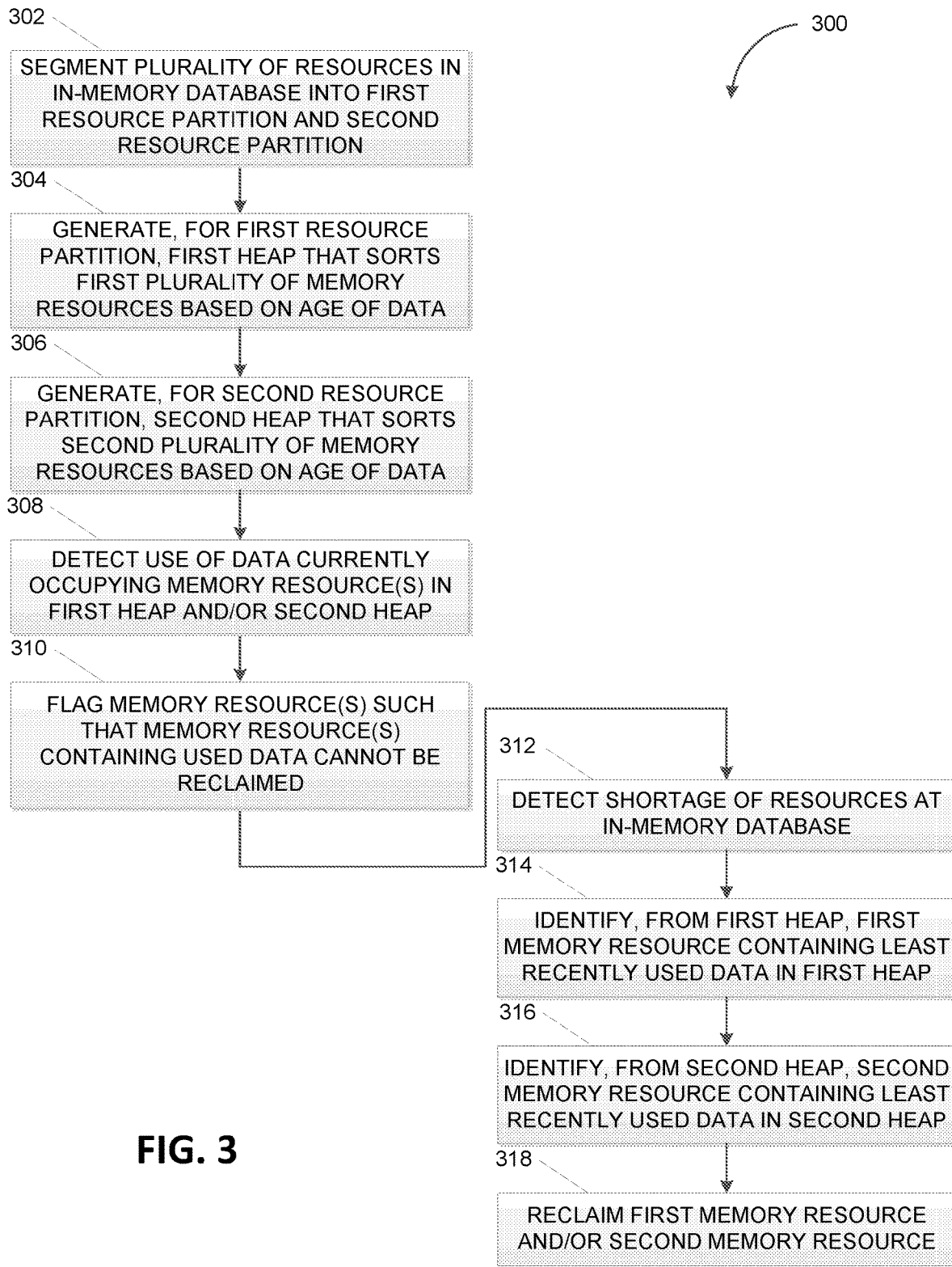
FIG. 3 depicts a flowchart illustrating a process for reclaiming memory resources in an in-memory database, in accordance with some example embodiments.

FIG. 3 depicts a flowchart illustrating a process 300 for reclaiming memory resources in the in-memory database 110, in accordance with some example embodiments. Referring to FIGS. 1A and 2-3, the process 300 may be performed by the in-memory database 110 (e.g., the first database management system 115).

The in-memory database 110 may segment a plurality of memory resources in the in-memory database 110 into a first memory resource partition and a second memory resource partition (302). For example, the in-memory database 110 may segment the plurality of memory resources (e.g., the memory resources $R_1$ through $R_n$) into at least the first memory resource partition 210 and the second memory resource partition 220. The plurality of memory resources may correspond to portions of memory or space in the in-memory database 110. The in-memory database 110 may apply one or more hash functions to determine which memory resource partition (e.g., the first memory resource partition 210 and/or the second memory resource partition 220) in which to group a memory resource.

The in-memory database 110 may generate, for the first resource partition, at least a first heap that sorts a first plurality of memory resources based at least in part on an age of data occupying the first plurality of resources (304). For example, the in-memory database 110 may generate, for the first resource partition 210, the first heap 230 and the second heap 232. The in-memory database 110 can further generate, for the second resource partition, at least a second heap that sorts a second plurality of memory resources based at least in part on an age of data occupying the second plurality of resource (306).

In some example embodiments, the in-memory database 110 may generate, for each memory resource partition, a separate heap for each weight class of data present in the memory resource partition. For example, the in-memory database 110 may generate the first heap 230 for the weight class $w_1$ of data within the first partition 210 and the third heap 234 for the weight class $w_1$ of data within the second partition 220. Similarly, the in-memory database 110 may generate the second heap 232 for the weight class $w_2$ of data within the first partition 210 and the fourth heap 346 for the weight class $w_2$ of data within the second partition 220.

According to some example embodiments, the in-memory database 110 may generate the heaps asynchronously such that more than one heap may be generated at a same time or in parallel. For example, the first heap 230, the second heap 232, the third heap 234, and the fourth heap 236 may be generated asynchronously. As such, the first heap 230, the second heap 232, the third heap 234, and the fourth heap 236 may be generated at a same time. Moreover, in some example embodiments, the in-memory database 110 may generate the heaps according to a schedule (e.g., every hour) and/or in anticipation of a shortage of in-memory database memory resources (e.g., when an amount of available in-memory database memory resources falls below a threshold value).

In some example embodiments, the memory resource within a heap may be sorted based on an age (or another attribute) of the data currently occupying those memory resources. For example, the in-memory database 110 may generate the heaps such that the data currently occupying a memory resource at a parent node is used at a same or earlier time than the data currently occupying a memory resource at a child node. The memory resources within a heap may be sorted according to a different attribute without departing from the scope of the present disclosure.

The in-memory database 110 may detect a use of data currently occupying at least one memory resource in the first heap and/or the second heap (308). In response to detecting the use of the data, the in-memory database 110 may flag the at least one memory resource such that the at least one memory resource containing used data cannot be reclaimed (310). In some example embodiments, using (e.g., writing to or reading) data after the generation of the heaps may change the age of the data. As such, the memory resource cannot be reclaimed since the memory resource may no longer contain the least recently used data. Flagging the memory resource may thus prevent memory resources from being reclaimed prematurely.

The in-memory database 110 may detect a shortage of memory resources at the in-memory database 110 (312). For example, the in-memory database 110 may detect a shortage of memory resources when an amount of available memory resources remaining in the in-memory database 110 falls below a threshold value. In response to detecting the shortage of memory resources, the in-memory database 110 may identify, from the first heap, a first memory resource containing a least recently used data in the first heap. (314). The in-memory database 110 may further identify, from the second heap, a second memory resource containing a least recently used data in the second heap (316). The in-memory database 110 may reclaim at least one of the first memory resource and the second memory resource (318). For example, in some example embodiments, the in-memory database 110 may use the heaps (e.g., the first heap 230, the second heap 232, the third heap 234, and/or the fourth heap 236) to identify memory resources containing the least recently used data and/or data having the lowest weight class. The in-memory database 110 may further use the heaps to identify memory resources that have not been flagged (e.g., at operation 308). Such data may be discarded (e.g., overwritten) such that the memory resources containing the data may be reclaimed to accommodate different data (e.g., from the persistent data store 130).

Figure 4A:
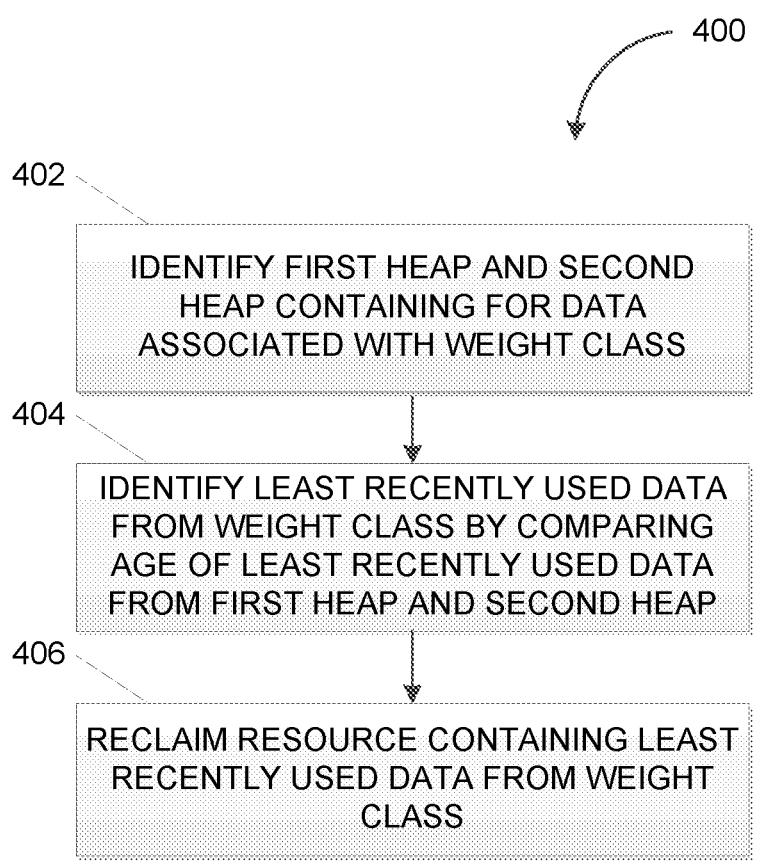
FIG. 4A depicts a flowchart illustrating a process for reclaiming memory resources in an in-memory database, in accordance with some example embodiments.

FIG. 4A depicts flowchart illustrating a process 400 for reclaiming memory resources in the in-memory database 110, in accordance with some example embodiments. Referring to FIGS. 1A, 2-3, and 4A, the process 400 may be performed by the in-memory database 110 (e.g., the first database management system 115) and may implement operation 312 of the process 300.

Reclaiming a memory resource may provide an indication that the data currently occupying the memory resource may be discarded (e.g., overwritten) and that the memory resource may be used to store different data. In some example embodiments, memory resources containing the least recently used data of the lowest weight class (e.g., least important or lowest priority) may be reclaimed before those memory resources containing more recently used data and/or data having a higher weight class. Thus, in some example embodiments, the in-memory database 110 may identify memory resources containing data of the lowest weight class by identifying heaps associated with the lowest weight class. The in-memory database 110 may subsequently identify the resources containing the least recently used data amongst those heaps associated with the lowest weight class.

The in-memory database 110 may identify a first heap and a second heap containing data associated with a weight class (402). For example, the in-memory database 110 may identify the first heap 230 and the third heap 234, which are both for data associated with the weight class $w_1$. Alternately or additionally, the in-memory database 110 may identify the second heap 232 and the fourth heap 236, which are both for data associated with the weight class $w_2$.

The in-memory database 110 may identify a least recently used data from the weight class by comparing a respective age of a least recently used data from the first heap and a least recently used data from the second heap (404). For example, the least recently used data from a heap may occupy a memory resource at a root node of the heap. Thus, to identify a least recently used data from a particular (e.g., lowest) weight class (e.g., the weight class $w_1$), the in-memory database 110 may compare an age of the data occupying the memory resources at a root node of the heaps associated with that weight class (e.g., the memory resources $R_4$ or $R_5$).

The in-memory database 110 may reclaim the memory resource containing the least recently used data from the weight class (406). For example, the in-memory database 110 may compare an age of the data currently occupying the memory resources $R_4$ and $R_5$ and determine that the data occupying the memory resource $R_4$ was used earlier than the data occupying the memory resource $R_5$. As such, the in-memory database 110 may reclaim the memory resource $R_4$ such that the data currently occupying the memory resource $R_4$ can be overwritten to accommodate different data.

In some embodiments of the current subject matter, the in-memory database 110 may overlook flagged memory resources when identifying the least recently used data. For example, the memory resource $R_8$ may be flagged and cannot be reclaimed even though it is at the root node of the fourth heap 236. Similarly, the memory resources $R_6$ may also be flagged and cannot be reclaimed even when the memory resource $R_6$ advances to a root node of the second heap 232.

Figure 4B:
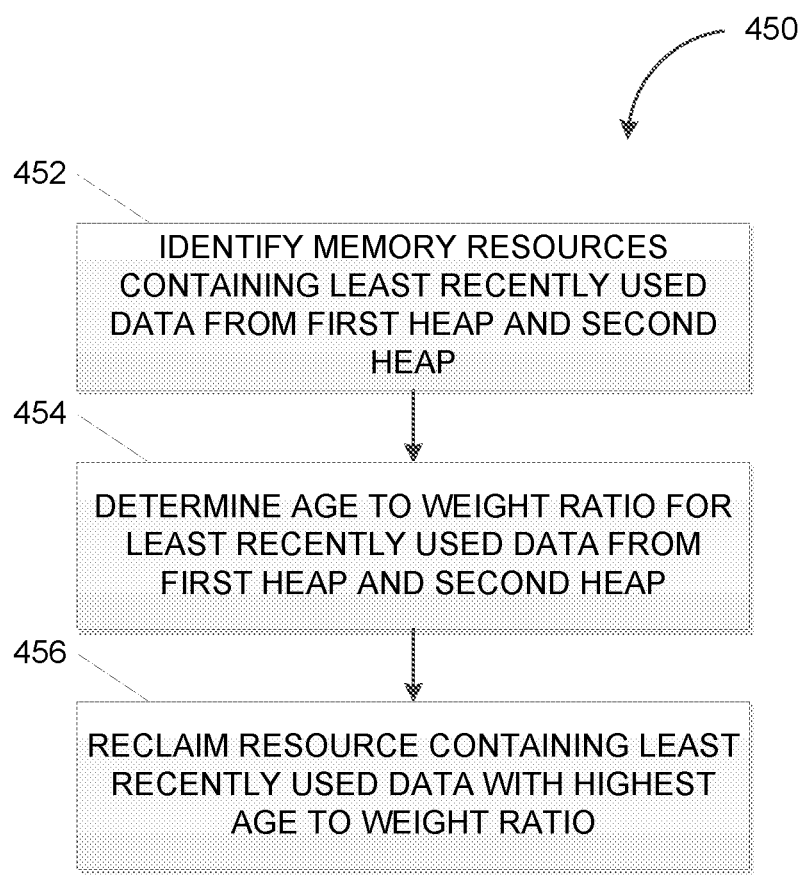
FIG. 4B depicts a flowchart illustrating a process for reclaiming memory resources in an in-memory database, in accordance with some example embodiments.

FIG. 4B depicts a flowchart illustrating a process 450 for reclaiming memory resources in the in-memory database 110, in accordance with some example embodiments. Referring to FIGS. 1A, 2-3, and 4B, the process 450 may be performed by the in-memory database 110 (e.g., the first database management system 115) and may implement operation 312 of the process 300.

As noted earlier, reclaiming a memory resource may provide an indication that the data currently occupying the memory resource may be discarded (e.g., overwritten) and that the memory resource may be used to store different data. In some example embodiments, when memory resources are reclaimed may be determined based on an age to weight class ratio of the data occupying the memory resources. Thus, in some example embodiments, the in-memory database 110 may reclaim memory resources containing data with a higher age to weight class ratio before memory resources containing data with a lower age to weight class ratio.

The in-memory database 110 may identify memory resources containing a least recently used data from a first heap and a second heap (452). For example, the in-memory database 110 may identify memory resources containing the least recently used data from first heap 230, the second heap 232, the third heap 234, and/or the fourth heap 236. In some example embodiments, the in-memory database 110 may disregard flagged memory resources (e.g., the memory resource $R_8$) when making this identification as a flagged memory resource cannot be reclaimed (e.g., due to use of the data currently occupying the memory resource after the generation of the heap).

The in-memory database 110 may determine an age to weight class ratio for the least recently used data from the first heap and the second heap (454). For example, the in-memory database 110 can determine an age to weight class ratio for the data occupying the memory resources $R_2$, $R_4$, and $R_5$.

The in-memory database 110 may reclaim a memory resource containing a least recently used data with a highest age to weight ratio (456). For example, the in-memory database 110 can compare the age to weight class ratios for the data occupying the memory resources $R_2$, $R_4$, and $R_5$.

The one of the memory resources $R_2$, $R_4$, and $R_5$ that contains data with the highest age to weight ratio may be reclaimed.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. These logic flows may include additional and/or different operations than those shown in the accompanying figures without departing from the scope of the present disclosure. One or more operations of these logic flows may further be omitted and/or repeated without departing from the scope of the present disclosure. Other embodiments may be within the scope of the following claims.

What is claimed:

1. A system including at least one processor and at least one memory including program code, which when executed causes operations comprising:

segmenting, at an in-memory database, a plurality of memory resources into a first resource partition and a second resource partition;

generating, for the first resource partition, a first heap containing a first plurality of memory resources, wherein the first plurality of memory resources are sorted based at least in part on an age of data occupying the first plurality of memory resources, and wherein the first heap is associated with a first weight class corresponding to a first priority of the data occupying the first plurality of memory resources;

generating, for the second resource partition, a second heap containing a second plurality of memory resources, wherein the second plurality of memory resources are sorted based at least in part on an age of data occupying the second plurality of memory resources, and wherein the second heap is associated with a second weight class corresponding to a second priority of the data occupying the second plurality of memory resources; and in response to detecting a shortage of memory resources at the in-memory database, identifying, from the first heap, a first memory resource containing a first least recently used data in the first heap, identifying, from the second heap, a second memory resource containing a second least recently used data in the second heap, determining a first age to weight class ratio of a first data occupying the first memory resource, the first age to weight class ratio comprising a first ratio of a first age of the first data relative to the first priority of the first data, determining a second age to weight class ratio of a second data occupying the second memory resource, the second age to weight class ratio comprising a second ratio of a second age of the second data relative to the second priority of the data, and reclaiming the first memory resource from the first heap before the second memory resource from the second heap, wherein the reclaiming is based at least in part on the first age to weight class ratio of the first data being higher than the second age to weight class ratio of the second data.

2. The system of claim 1, wherein the reclaiming includes overwriting the first data occupying the first memory resource and the second data occupying the second memory resource.

3. The system of claim 1, wherein a third plurality of memory resources from a third heap associated with the first weight class are reclaimed before the second plurality of memory resources from the second heap associated with the second weight class based at least on the first weight class being lower than the second weight class.

4. The system of claim 3, further comprising:

identifying the first least recently used data from the first weight class at least by comparing the first age of the first data occupying the first memory resource and a third age of a third data occupying a third memory resource from the third heap; and reclaiming the first memory resource before the third memory resource based at least on the first age of the first data being greater than the second age of the third data.

5. The system of claim 1, further comprising:

detecting a use of the second data occupying the second memory resource; and in response to detecting the use of the second data occupying the second memory resource, flagging the second memory resource to at least prevent the second memory resource from being reclaimed.

6. The system of claim 1, wherein the first heap and the second heap are generated asynchronously.

7. The system of claim 3, further comprising:

generating, for the first resource partition and/or the second resource partition, a third heap.

8. A method, comprising:

segmenting, at an in-memory database, a plurality of memory resources into a first resource partition and a second resource partition;

generating, for the first resource partition, a first heap containing a first plurality of memory resources, wherein the first plurality of memory resources are sorted based at least in part on an age of data occupying the first plurality of memory resources, and wherein the first heap is associated with a first weight class corresponding to a first priority of the data occupying the first plurality of memory resources;

generating, for the second resource partition, a second heap containing a second plurality of memory resources, wherein the second plurality of memory resources are sorted based at least in part on an age of data occupying the second plurality of memory resources, and wherein the second heap is associated with a second weight class corresponding to a second priority of the data occupying the second plurality of memory resources; and in response to detecting a shortage of memory resources at the in-memory database, identifying, from the first heap, a first memory resource containing a first least recently used data in the first heap, identifying, from the second heap, a second memory resource containing a second least recently used data in the second heap, determining a first age to weight class ratio of a first data occupying the first memory resource, the first age to weight class ratio comprising a first ratio of a first age of the first data relative to the first priority of the first data, determining a second age to weight class ratio of a second data occupying the second memory resource, the second age to weight class ratio comprising a second ratio of a second age of the second data relative to the second priority of the data, and reclaiming the first memory resource from the first heap before the second memory resource from the second heap, wherein the reclaiming is based at least in part on the first age to weight class ratio of the first data being higher than the second age to weight class ratio of the second data.

9. The method of claim 8, wherein the reclaiming includes overwriting the first data occupying the first memory resource and the second data occupying the second memory resource.

10. The method of claim 8, wherein a third plurality of memory resources from a third heap associated with the first weight class are reclaimed before the second plurality of memory resources from the second heap associated with the second weight class based at least on the first weight class being lower than the second weight class.

11. The method of claim 10, further comprising:

identifying the first least recently used data from the first weight class at least by comparing the first age of the first data occupying the first memory resource and a third age of a third data occupying a third memory resource from the third heap; and reclaiming the first memory resource before the third memory resource based at least on the first age of the first data being greater than the second age of the third data.

12. The method of claim 8, further comprising:

detecting a use of the second data occupying the second memory resource; and in response to detecting the use of the second data occupying the second memory resource, flagging the second memory resource to at least prevent the second memory resource from being reclaimed.

13. A non-transitory computer-readable storage medium including program code which when executed by at least one processor causes operations comprising:

segmenting, at an in-memory database, a plurality of memory resources into a first resource partition and a second resource partition;

generating, for the first resource partition, a first heap containing a first plurality of memory resources, wherein the first plurality of memory resources are sorted based at least in part on an age of data occupying the first plurality of memory resources, and wherein the first heap is associated with a first weight class corresponding to a first priority of the data occupying the first plurality of memory resources;

generating, for the second resource partition, a second heap containing a second plurality of memory resources, wherein the second plurality of memory resources are sorted based at least in part on an age of data occupying the second plurality of memory resources, and wherein the second heap is associated with a second weight class corresponding to a second priority of the data occupying the second plurality of memory resources; and in response to detecting a shortage of memory resources at the in-memory database, identifying, from the first heap, a first memory resource containing a first least recently used data in the first heap, identifying, from the second heap, a second memory resource containing a second least recently used data in the second heap, determining a first age to weight class ratio of a first data occupying the first memory resource, the first age to weight class ratio comprising a first ratio of a first age of the first data relative to the first priority of the first data, determining a second age to weight class ratio of a second data occupying the second memory resource, the second age to weight class ratio comprising a second ratio of a second age of the second data relative to the second priority of the data, and reclaiming the first memory resource from the first heap before the second memory resource from the second heap, wherein the reclaiming is based at least in part on the first age to weight class ratio of the first data being higher than the second age to weight class ratio of the second data.

14. The computer-readable storage medium of claim 13, wherein a third plurality of memory resources from a third heap associated with the first weight class are reclaimed before the second plurality of memory resources from the second heap associated with the second weight class based at least on the first weight class being lower than the second weight class.

* * * * *